(12) United States Patent
Nakayama

(10) Patent No.: US 10,532,541 B2
(45) Date of Patent: Jan. 14, 2020

(54) INTERMEDIATE FILM FOR LAMINATED GLASS, AND LAMINATED GLASS

(71) Applicant: SEKISUI CHEMICAL CO., LTD., Osaka (JP)

(72) Inventor: Kazuhiko Nakayama, Shiga (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 0 days.

(21) Appl. No.: 15/551,628

(22) PCT Filed: Apr. 13, 2016

(86) PCT No.: PCT/JP2016/061915
§ 371 (c)(1),
(2) Date: Aug. 17, 2017

(87) PCT Pub. No.: WO2016/167287
PCT Pub. Date: Oct. 20, 2016

(65) Prior Publication Data
US 2018/0037008 A1    Feb. 8, 2018

(30) Foreign Application Priority Data

Apr. 15, 2015    (JP) ................... 2015-083432

(51) Int. Cl.
*B32B 17/10*    (2006.01)
*B29C 59/04*    (2006.01)
*B29K 29/00*    (2006.01)

(52) U.S. Cl.
CPC ........ *B32B 17/10587* (2013.01); *B29C 59/04* (2013.01); *B32B 17/10036* (2013.01);
(Continued)

(58) Field of Classification Search
CPC ........ B32B 17/10587; B32B 17/10036; B32B 17/10568; B32B 17/10559;
(Continued)

(56) References Cited

U.S. PATENT DOCUMENTS 4,452,840 A    6/1984 Sato et al.
5,346,569 A *  9/1994 Simon ............... B32B 17/10568
                                                    156/102
(Continued)

FOREIGN PATENT DOCUMENTS

EP    0 215 976    4/1987
EP    0 525 403    2/1993
(Continued)

OTHER PUBLICATIONS

International Search Report dated Jul. 19, 2016 in International (PCT) Application No. PCT/JP2016/061915.
(Continued)

*Primary Examiner* — Catherine A. Simone
(74) *Attorney, Agent, or Firm* — Wenderoth, Lind & Ponack, L.L.P.

(57) ABSTRACT

The present invention aims to provide an interlayer film for a laminated glass which is easily peelable without autohesion even after storage in a stacked state, and a laminated glass prepared using the interlayer film for a laminated glass. The present invention relates to an interlayer film for a laminated glass, having a large number of protrusions on at least one surface, the surface having an arrangement density of the protrusions of 3 protrusions/mm$^2$ or more, and the protrusions having an area ratio of 15 to 75% to the surface.

2 Claims, 2 Drawing Sheets

(52) U.S. Cl.
CPC .. *B32B 17/10568* (2013.01); *B32B 17/10605* (2013.01); *B32B 17/10761* (2013.01); *B32B 17/10825* (2013.01); *B32B 17/10935* (2013.01); *B32B 17/10972* (2013.01); *B29K 2029/00* (2013.01); *B29K 2821/00* (2013.01); *B29K 2905/00* (2013.01); *B29K 2995/0098* (2013.01); *B32B 2307/746* (2013.01); *B32B 2307/748* (2013.01); *B32B 2329/06* (2013.01)

(58) Field of Classification Search
CPC .......... B32B 17/10577; B32B 17/1055; B32B 17/10972; B32B 2307/746; B32B 2307/748; Y10T 428/24479
See application file for complete search history.

(56) References Cited

U.S. PATENT DOCUMENTS 5,965,235 A * 10/1999 McGuire .............. B29C 51/225
428/156

| | | |
|---|---|---|
| 2008/0286530 A1 | 11/2008 | Smith |
| 2014/0220286 A1 | 8/2014 | Honeycutt et al. |

FOREIGN PATENT DOCUMENTS

| | | |
|---|---|---|
| EP | 1 233 007 | 8/2002 |
| EP | 3 281 926 | 2/2018 |
| JP | 6-198809 | 7/1994 |
| JP | 8-26789 | 1/1996 |
| JP | 2000-203901 | 7/2000 |
| JP | 2000-319045 | 11/2000 |
| JP | 2002-154156 | 5/2002 |
| RU | 2 290 315 | 12/2006 |
| RU | 91 716 | 2/2010 |
| WO | 03/074270 | 9/2003 |

OTHER PUBLICATIONS

Extended European Search Report dated Nov. 20, 2018 in European Application No. 16780078.8.

* cited by examiner (a)

(b)

(c)

INTERMEDIATE FILM FOR LAMINATED GLASS, AND LAMINATED GLASS

TECHNICAL FIELD

The present invention relates to an interlayer film for a laminated glass which is easily peelable without autohesion even after storage in a stacked state, and a laminated glass prepared using the interlayer film for a laminated glass.

BACKGROUND ART

A laminated glass including two glass plates integrated through an interlayer film for a laminated glass containing plasticized polyvinyl butyral is widely used, particularly, for vehicle windshields.

In the process for producing a laminated glass, deaeration properties upon stacking a glass plate and an interlayer film for a laminated glass on top of each other is important. The interlayer film for a laminated glass therefore commonly has a large number of recesses formed on at least one surface for the purpose of ensuring the deaeration properties in production of a laminated glass. In particular, when the recesses each have a groove shape with a continuous bottom and such recesses in the shape of engraved lines are regularly adjacent and parallel to each other, excellent deaeration properties can be exhibited.

In a method for producing a laminated glass, for example, an interlayer film for a laminated glass unwound from a rolled body is cut into an appropriate size, and the resulting interlayer film for a laminated glass is sandwiched between at least two glass plates. The obtained laminate is placed in a rubber bag and vacuum suctioned so that the glass plates and the interlayer film are preliminarily pressure bonded while air remaining therebetween is removed. Then, the laminate is pressurized with heat, for example, in an autoclave for final pressure bonding (e.g., Patent Literature 1).

In such a method for producing a laminated glass, interlayer films for a laminated glass cut into a predetermined shape in advance are stacked and stored in a constant temperature and humidity room for efficient production. However, the stacked interlayer films for a laminated glass adhere to each other (autohesion) during storage and, disadvantageously, cannot be peeled by a machine transporting interlayer films for a laminated glass or by human power.

CITATION LIST

Patent Literature

Patent Literature 1: JP H08-26789 A

SUMMARY OF INVENTION

Technical Problem

In light of the circumstances, the present invention aims to provide an interlayer film for a laminated glass which is easily peelable without autohesion even after storage in a stacked state, and a laminated glass prepared using the interlayer film for a laminated glass.

Solution to Problem

The present invention relates to an interlayer film for a laminated glass, having a large number of protrusions on at least one surface, the surface having an arrangement density of the protrusions of 3 protrusions/mm² or more, and the protrusions having an area ratio of 15% to 75% to the surface.

The present invention is specifically described in the following.

The interlayer film for a laminated glass of the present invention has a large number of protrusions on at least one surface. With this structure, deaeration properties during production of a laminated glass can be ensured.

Examples of the shape of the protrusions include, but are not particularly limited to, spherical, blockish, conical, pyramidal, circular truncated cone, truncated pyramid, prismatic, and cylindrical shapes. The protrusions may have a shape transferred from an embossing roll.

FIG. 1 is a view schematically illustrating an exemplary interlayer film for a laminated glass having a large number of spherical protrusions on a surface. FIG. 2 is a view schematically illustrating an exemplary interlayer film for a laminated glass having a large number of blockish protrusions on a surface.

In the interlayer film for a laminated glass of the present invention, the surface has an arrangement density of the protrusions of 3 protrusions/mm² or more, and the protrusions have an area ratio of 15% to 75% to the surface. When the arrangement density of the protrusions and the area of the protrusions occupying the surface each fall within the above range, the interlayer film for a laminated glass is easily peelable without autohesion even after storage in a stacked state. The lower limit of the arrangement density of the protrusions is preferably 5 protrusions/mm², more preferably 12 protrusions/mm², still more preferably 20 protrusions/mm², particularly preferably 26 protrusions/mm². When the arrangement density of the protrusions is equal to or more than the preferred lower limit, autohesion can be further prevented because load is dispersed due to increase in the number of point contacts upon storage of an interlayer film for a laminated glass in a stacked state. The interlayer film for a laminated glass is therefore more easily peelable. The upper limit of the arrangement density of the protrusions is preferably 80 protrusions/mm², more preferably 53 protrusions/mm², still more preferably 50 protrusions/mm², particularly preferably 30 protrusions/mm². When the arrangement density of the protrusions is equal to or less than the preferred upper limit, it is easy to adjust roughness as desired upon formation of the protrusions. Particularly, the surface can easily have high ten-point average roughness Rz, namely, can be easily roughened. Thus, sealing of the glass plates and the interlayer film for a laminated glass in an insufficiently deaerated state can be prevented at the outer edge of the interlayer film for a laminated glass, and sealing of the glass plates and the whole interlayer film for a laminated glass can be achieved after sufficient deaeration. Therefore, the transparency of a laminated glass to be obtained is improved. The lower limit of the area ratio of the protrusions to the surface is preferably 26%, and the upper limit thereof is preferably 65%. The lower limit is more preferably 40%, and the upper limit is more preferably 58%.

FIG. 3 is a view schematically illustrating a case where interlayer films for a laminated glass each having protrusions on a surface are stacked. When the arrangement density of the protrusions and the area of the protrusions occupying the surface fall within the ranges specified by the present invention, the protrusions on the respective surfaces of the stacked interlayer films for a laminated glass come in point contact as shown in FIG. 3(a) to minimize the contact area, preventing autohesion even after storage in a stacked state. In contrast to this, when the protrusions have a smaller arrangement density and have a smaller area occupying the surface, the protrusions on the respective surfaces of the stacked interlayer films for a laminated glass come in staggered contact as shown in FIG. 3(b) to increase the contact area. Alternatively, when the protrusions have a larger arrangement density and have a larger area occupying the surface, the protrusions on the respective surfaces of the stacked interlayer films for a laminated glass come in surface contact as shown in FIG. 3(c) to increase the contact area.

The arrangement density of the protrusions can be measured by, for example, the following method.

The measurement employs a three-dimensional white light interference microscope (e.g., ContourGT-K available from Bruker AXS GmbH). The surface of the interlayer film for a laminated glass is measured in a 4 mm square field of view at an objective lens magnification of 50 times and an internal lens magnification of 0.5 times to obtain images. In this operation, the light quantity and threshold are set as appropriate so as to minimize noise in the measurement. After planarization and noise removal processes, data on the heights of only the protrusions is extracted. Subsequently, the number of the protrusions is counted from the extracted height data and divided by the area of the field of view to determine the arrangement density of the protrusions per $mm^2$. Protrusions that are not wholly displayed in an image are counted as ½. Analytical software "Vision64" included in the apparatus can be used in image processing. Conditions for the planarization and noise removal processes involve performing the first processing "Terms Removal (F-Operator)" on Analysis Toolbox under the analysis condition "Tilt only (Plane Fit)" and performing the second processing "Statistic Filter" under the analysis conditions "Filter type: Sigma" and "Filter size: 5". The third processing "Multi Region" to extract the areas of only the protrusions is performed under analysis conditions involving Zero level: "Background", Region Finding Routine: "By Threshold", threshold: 1 µm, and Region Finding option including "minimum Region size": 5,000 $\mu m^2$ and "Region Level": Peaks with "Exclude Edge Region" not selected. The number of the protrusions extracted by the third processing is counted to calculate the arrangement density of the protrusions per $mm^2$. Protrusions that are not wholly displayed in an image are counted as ½.

The area of the protrusions occupying the surface can be measured by, for example, the following method.

The measurement employs a three-dimensional white light interference microscope (e.g., ContourGT-K available from Bruker AXS GmbH). The surface of the interlayer film for a laminated glass is measured in a 4 mm square field of view at an objective lens magnification of 50 times and an internal lens magnification of 0.5 times to obtain images. In this operation, the light quantity and threshold are set as appropriate so as to minimize noise in the measurement. After planarization and noise removal processes, data on the heights of only the protrusions is extracted. The areas of the protrusions in the extracted height data are totalized to calculate the area ratio of the protrusions per $mm^2$.

Analytical software "Vision64" included in the apparatus can be used in image processing. Conditions for the planarization and noise removal processes involve performing the first processing "Terms Removal (F-Operator)" on Analysis Toolbox under the analysis condition "Tilt only (Plane Fit)" and performing the second processing "Statistic Filter" under the analysis conditions "Filter type: Sigma" and "Filter size: 5". The third processing "Multi Region" to extract the areas of only the protrusions is performed under analysis conditions involving Zero level: "Background", Region Finding Routine: "By Threshold", threshold: 1 µm, and Region Finding option including "minimum Region size": 5,000 $\mu m^2$ and "Region Level": Peaks with "Exclude Edge Region" not selected. Since the area of one projection is calculated by the third processing, the areas of the extracted protrusions are totalized to calculate the area ratio of the protrusions per $mm^2$.

The surface having the protrusions has recesses each having a groove shape with a continuous bottom, and adjacent recesses are regularly parallel to each other (hereinafter, also referred to as "in the shape of engraved lines"). Commonly, ease of deaeration upon pressure bonding of a laminate including an interlayer film for a laminated glass interposed between two glass plates closely relates to the continuousness and smoothness of the bottoms of the recesses. When the recesses are in the shape of engraved lines, the continuousness of the bottoms is further improved to markedly increase the deaeration properties.

The term "regularly parallel" means that adjacent recesses each having the groove shape mentioned above may be parallel to each other at equal intervals, or adjacent recesses in the shape of engraved lines are parallel to each other, but all of adjacent recesses in the shape of engraved lines are not necessarily parallel to each other at equal intervals.

The protrusions preferably each have an arithmetical mean height Sa (hereinafter, also referred to as an "apex Sa value") on the surface of 200 nm or more as measured in conformity with ISO 25178.

The apex Sa value is calculated after processing of an image of the interlayer film surface obtained using a three-dimensional white light interference microscope to remove coarse protrusions and recesses, and is a three-dimensional shape parameter indicating an in-plane arithmetical mean height. Namely, Sa is a parameter indicating a pattern of fine protrusions and recesses except for large protrusions and recesses. In the case where the pattern of protrusions and recesses on the surface of the interlayer film for a laminated glass is controlled such that the apex Sa value is 200 nm or more, autohesion can be further prevented. The lower limit of the apex Sa value is more preferably 250 nm.

The upper limit of the apex Sa value is not particularly limited. In order to reliably deform protrusions and recesses upon pressure bonding of an interlayer film for a laminated glass sandwiched between at least two glass plates during production of a laminated glass, the upper limit is practically about 3,000 nm.

Specifically, the apex Sa value can be measured by, for example, the following method.

The surface of the interlayer film for a laminated glass is measured using a three-dimensional white light interference microscope (e.g., ContourGT-K available from Bruker AXS GmbH) in a 1 mm square field of view at an objective lens magnification of 115 times, an internal lens magnification of 0.5 times, and a resolution set to Full resolution to obtain images. In this operation, the light quantity and threshold are set as appropriate so as to minimize noise in the measurement. The obtained images are subjected to planarization and noise removal processes. Data on the heights of only the protrusions is further extracted by the Mask data processing. Coarse protrusions and recesses are removed from the extracted data region using a Gaussian filter. Then, the arithmetical mean height Sa value is calculated by a method specified by ISO 25178. Analytical software "Vision64" included in the apparatus can be used in image processing. Conditions for the planarization and noise removal processes involve performing the first processing "Terms Removal (F-Operator)" on Analysis Toolbox under the analysis condition "Tilt only (Plane Fit)", performing the second processing "Statistic Filter" under the analysis conditions "Filter type: Sigma" and "Filter size: 5", and further performing the processing "data Restore" by selecting the analysis condition "Legacy", selecting Restore Edge condition, and setting Iteration condition to a value for sufficient data complement. In the third processing "Mask data" to extract image data on only the protrusions, the Height threshold of a histogram displayed under the analysis condition Histogram Mask is determined to be between 0.2 and −0.2 μm, and data on height regions equal to or more than the threshold is extracted under the condition "Mask: Left". The successful setting of the threshold to between 0.2 and −0.2 μm can be confirmed from the histogram display of the data after the extraction. In order to remove coarse protrusions and recesses, the fourth processing "Gaussian Regression Filter" is performed under the analysis conditions "Short wavelength pass, order: 2, Type: Regular, and Long wavelength cutoff: 0.025 mm", and advance setup is performed under initial conditions. The image data after the first processing through the third processing is subjected to the fourth processing "S parameters-height" under the analysis condition "Removal tilt: True". The resulting "Sa" is used as the arithmetical mean height Sa value. Nine points in a 10 cm square sample of the interlayer film for a laminated glass are measured such that these points are 3 cm or more distant from each other. The average of the measurement values is used as the Sa value.

The measurement environment is 23° C. and 30 RH %.

In the interlayer film for a laminated glass of the present invention, the surface having the protrusions preferably has a ten-point average roughness Rz of 15 μm or more as measured in conformity with JIS B 0601 (1994). With this structure, the adhesion force (autohesion force) between the interlayer films for a laminated glass can be reduced when the interlayer film for a laminated glass is stored in a stacked state. The lower limit of the Rz value is more preferably 25 μm.

The upper limit of the Rz value is not particularly limited. In order to reliably deform protrusions and recesses upon pressure bonding of an interlayer film for a laminated glass sandwiched between at least two glass plates, the upper limit is preferably 70 μm or less, more preferably 55 μm or less.

The Rz can be measured, for example, by data processing of digital signals measured using a surface roughness measuring instrument (e.g., SE1700α available from Kosaka Laboratory Ltd.).

The pattern mentioned above on the surface of the interlayer film for a laminated glass may be formed by any method, preferably, a method including, for example, a first step of adjusting arithmetical mean height Sa on a surface of a resin film to an apex Sa value of 200 nm or more, and a second step of forming protrusions.

The first step of adjusting the arithmetical mean height Sa of a surface of an interlayer film for a laminated glass to an apex Sa value of 200 nm or more is not particularly limited, and is performed by forming fine protrusions and recesses by, for example, an embossing roll method, a calender roll method, a profile extrusion method, or an embossing method with controlled melt fracture.

In particular, for example, the embossing method with controlled melt fracture is preferably performed by adjusting a cooling rate after extrusion of a film from a die. In the embossing method with controlled melt fracture, a film extruded from a die is cooled in a cooling water tank. In this operation, the cooling rate of the film can be adjusted to thereby control the pattern of protrusions and recesses to be formed. Specifically, the intended arithmetical mean height Sa can be achieved, for example, by shortening the distance from the die to the cooling water tank and increasing the cooling rate of the film. Alternatively, the intended arithmetical mean height Sa can be achieved by adjusting the surface pattern of an embossing roll for use in the embossing roll method.

The second step of forming protrusions is not particularly limited and is performed by, for example, an embossing roll method, a calender roll method, or a profile extrusion method. In particular, the embossing roll method is preferred.

The interlayer film for a laminated glass of the present invention may have a single layer structure consisting of one resin layer or a multilayer structure including two or more resin layers laminated together.

In the case of having a multilayer structure, the interlayer film for a laminated glass of the present invention may include, as two or more resin layers mentioned above, a first resin layer and a second resin layer having different characteristics. Such an interlayer film for a laminated glass can have various properties which are hardly achieved by a single layer structure.

The resin layer preferably contains a thermoplastic resin.

Examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymers. In particular, the resin layer preferably contains polyvinyl acetal or an ethylene-vinyl acetate copolymer, more preferably contains polyvinyl acetal.

The polyvinyl acetal can be prepared, for example, by acetalization of polyvinyl alcohol with an aldehyde. The polyvinyl alcohol can be produced, for example, by saponification of polyvinyl acetate. The polyvinyl alcohol commonly has a degree of saponification within a range of 70 to 99.8 mol %.

The polyvinyl alcohol has an average degree of polymerization of preferably 200 or more, more preferably 500 or more, still more preferably 1,700 or more, particularly preferably more than 1,700, and preferably 5,000 or less, more preferably 4,000 or less, still more preferably 3,000 or less, particularly preferably less than 3,000. When the average degree of polymerization is equal to or more than the lower limit, a laminated glass to be obtained has higher penetration resistance. When the average degree of polymerization is equal to or less than the upper limit, formation of an interlayer film is facilitated.

The average degree of polymerization of the polyvinyl alcohol can be obtained by the method in conformity with JIS K6726 "Testing methods for polyvinyl alcohol".

The carbon number of an acetal group contained in the polyvinyl acetal is not particularly limited. The aldehyde for use in production of the polyvinyl acetal is not particularly limited. The lower limit of the carbon number of the acetal group in the polyvinyl acetal is preferably 3, and the upper limit thereof is preferably 6. When the carbon number of the acetal group in the polyvinyl acetal is 3 or more, an interlayer film has a sufficiently low glass transition temperature, and bleeding out of a plasticizer can be prevented. When the carbon number of the aldehyde is 6 or less, synthesis of the polyvinyl acetal can be facilitated to ensure the productivity. The C3-C6 aldehyde may be a linear or branched aldehyde, and examples thereof include n-butyraldehyde and n-valeraldehyde.

The aldehyde is not particularly limited. Commonly, the aldehyde is preferably a C1-C10 aldehyde. Examples of the C1-C10 aldehyde include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these are propionaldehyde, n-butyraldehyde, isobutyraldehyde, n-hexylaldehyde, and n-valeraldehyde, more preferred are propionaldehyde, n-butyraldehyde, and isobutyraldehyde, and still more preferred is n-butyraldehyde. These aldehydes may be used alone or in combination of two or more thereof.

The hydroxy group content of the polyvinyl acetal is preferably 10 mol % or higher, more preferably 15 mol % or higher, still more preferably 18 mol % or higher, and preferably 40 mol % or lower, more preferably 35 mol % or lower. When the hydroxy group content is equal to or more than the lower limit, an interlayer film has a higher adhesion force. When the hydroxy group content is equal to or less than the upper limit, an interlayer film has high flexibility and is easily handled.

The hydroxy group content of the polyvinyl acetal is a value in percentage of the mole fraction obtained by dividing the amount of ethylene groups to which hydroxy groups are bonded by the total amount of ethylene groups of the main chain. The amount of ethylene groups to which hydroxy groups are bonded can be determined, for example, by measurement in conformity with JIS K6726 "Testing methods for polyvinyl alcohol" or in conformity with ASTM D1396-92.

The degree of acetylation (acetyl group content) of the polyvinyl acetal is preferably 0.1 mol % or more, more preferably 0.3 mol % or more, still more preferably 0.5 mol % or more, and preferably 30 mol % or less, more preferably 25 mol % or less, still more preferably 20 mol % or less. When the degree of acetylation is equal to or more than the lower limit, the polyvinyl acetal has high compatibility with a plasticizer. When the degree of acetylation is equal to or less than the upper limit, an interlayer film and a laminated glass to be obtained have high damp resistance.

The degree of acetylation is a value in percentage of the mole fraction obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain. The amount of ethylene groups to which acetal groups are bonded can be measured, for example, in conformity with JIS K6728 "Testing methods for polyvinyl butyral" or in conformity with ASTM D1396-92.

The degree of acetalization of the polyvinyl acetal (or the degree of butyralization of a polyvinyl butyral resin) is preferably 50 mol % or more, more preferably 53 mol % or more, still more preferably 60 mol % or more, particularly preferably 63 mol % or more, and preferably 85 mol % or less, more preferably 75 mol % or less, still more preferably 70 mol % or less. When the degree of acetalization is equal to or more than the lower limit, the polyvinyl acetal has high compatibility with a plasticizer. When the degree of acetalization is equal to or less than the upper limit, a reaction time necessary for production of the polyvinyl acetal is short.

The degree of acetalization is a value in percentage of the mole fraction obtained by dividing the amount of ethylene groups to which acetal groups are bonded by the total amount of ethylene groups of the main chain.

The degree of acetalization can be calculated by measuring the degree of acetylation and the hydroxy group content by the method in conformity with JIS K6728 "Testing methods for polyvinyl butyral" or the method in conformity with ASTM D1396-92, calculating their mole fractions from the obtained measurement results, and subsequently subtracting the mole fractions of the degree of acetylation and the hydroxy group content from 100 mol %.

The hydroxy group content, the degree of acetalization (degree of butyralization), and the degree of acetylation are preferably calculated from results of measurement by the method in conformity with JIS K6728 "Testing methods for polyvinyl butyral". In the case where the polyvinyl acetal is a polyvinyl butyral resin, the hydroxy group content, the degree of acetalization (degree of butyralization), and the degree of acetylation are preferably calculated from results of measurement by the method in conformity with JIS K6728 "Testing methods for polyvinyl butyral".

The resin layer preferably contains polyvinyl acetal and a plasticizer.

Any plasticizer may be used as long as it is commonly used in interlayer films for a laminated glass. Examples thereof include organic plasticizers such as monobasic organic acid esters and polybasic organic acid esters, and phosphoric acid plasticizers such as organophosphate compounds and organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. Among these, the resin layer contains preferably triethylene glycol-di-2-ethylhexanoate, triethylene glycol-di-2-ethylbutyrate, or triethylene glycol-di-n-heptanoate, more preferably triethylene glycol-di-2-ethylhexanoate.

The plasticizer content is not particularly limited. The plasticizer content based on 100 parts by mass of the thermoplastic resin is preferably 25 parts by mass or more, more preferably 30 parts by mass or more, and preferably 80 parts by mass or less, more preferably 70 parts by mass or less. When the plasticizer content is equal to or more than the lower limit, a laminated glass to be obtained has higher penetration resistance. When the plasticizer content is equal to or less than the upper limit, an interlayer film has higher transparency.

The resin layer preferably contains an adhesion modifier. In particular, the resin layer to be in contact with a glass plate in production of a laminated glass preferably contains an adhesion modifier.

As the adhesion modifier, for example, an alkali metal salt or an alkaline earth metal salt is preferably used. Examples of the adhesion modifier include salts such as potassium, sodium, and magnesium salts.

Examples of an acid forming the salts include organic carboxylic acids such as octylic acid, hexylic acid, 2-ethylbutyric acid, butyric acid, acetic acid, and formic acid, and inorganic acids such as hydrochloric acid and nitric acid. The resin layer to be in contact with a glass plate preferably contains magnesium salt as an adhesion modifier because the adhesion force between the glass plate and the resin layer can be easily adjusted in production of a laminated glass.

The resin layer may optionally contain additives such as an antioxidant, a light stabilizer, a modified silicone oil as an adhesion modifier, a flame retardant, an antistatic agent, a damp proofing agent, a heat ray reflecting agent, and a heat ray absorbing agent.

The thickness of the interlayer film for a laminated glass of the present invention is not particularly limited. The thickness of the interlayer film is preferably 0.1 mm or more, more preferably 0.25 mm or more, and preferably 3 mm or less, more preferably 1.5 mm or less, from a practical standpoint and from the viewpoint of sufficiently enhancing heat shielding properties. When the thickness of the interlayer film is equal to or more than the lower limit, a laminated glass to be obtained has high penetration resistance.

The interlayer film for a laminated glass of the present invention may be produced by any method. A conventionally known method can be employed in production of the interlayer film. For example, a thermoplastic resin and other optional components to be contained are kneaded and molded into an interlayer film. Extrusion molding is suitable for continuous production and is therefore preferred for production of the interlayer film.

The kneading may be performed by any method. An exemplary method employs an extruder, Plastograph, kneader, Banbury mixer, or calender roll. In particular, preferred is a method using an extruder because it is suitable for continuous production, and more preferred is a method using a twin-screw extruder.

Preferably, the interlayer film for a laminated glass of the present invention includes, as two or more resin layers mentioned above, at least a first resin layer and a second resin layer, and polyvinyl acetal contained in the first resin layer (hereafter, referred to as polyvinyl acetal A) has a hydroxy group content different from that of polyvinyl acetal contained in the second resin layer (hereafter, referred to as polyvinyl acetal B).

Due to different characteristics of the polyvinyl acetal A and the polyvinyl acetal B, an interlayer film for a laminated glass to be provided can have various properties which are hardly achieved by a single layer structure. For example, in a case where the first resin layer is interposed between two second resin layers and the polyvinyl acetal A has a lower hydroxy group content than the polyvinyl acetal B, the first resin layer tends to have a lower glass transition temperature than the second resin layer. As a result, the first resin layer is softer than the second resin layer, leading to higher sound insulation properties of the interlayer film for a laminated glass. In a case where the first resin layer is interposed between two second resin layers and the polyvinyl acetal A has a higher hydroxy group content than the polyvinyl acetal B, the first resin layer tends to have a higher glass transition temperature than the second resin layer. As a result, the first resin layer is harder than the second resin layer, leading to higher penetration resistance of the interlayer film for a laminated glass.

In the case where the first resin layer and the second resin layer each contain a plasticizer, the plasticizer content (hereafter, referred to as content A) of the first resin layer based on 100 parts by mass of the polyvinyl acetal is preferably different from the plasticizer content (hereafter, referred to as content B) of the second resin layer based on 100 parts by mass of the polyvinyl acetal. For example, in a case where the first resin layer is interposed between two second resin layers and the content A is higher than the content B, the first resin layer tends to have a lower glass transition temperature than the second resin layer. As a result, the first resin layer is softer than the second resin layer, leading to higher sound insulation properties of the interlayer film for a laminated glass. In a case where the first resin layer is interposed between two second resin layers and the content A is lower than the content B, the first resin layer tends to have a higher glass transition temperature than the second resin layer. As a result, the first resin layer is harder than the second resin layer, leading to higher penetration resistance of the interlayer film for a laminated glass.

The combination of two or more resin layers included in the interlayer film for a laminated glass of the present invention may be, for example, a sound insulation layer as the first resin layer and a protective layer as the second resin layer with an aim of improving the sound insulation properties of a laminated glass to be obtained. For higher sound insulation properties of a laminated glass to be obtained, preferably, the sound insulation layer contains polyvinyl acetal X and a plasticizer, and the protective layer contains polyvinyl acetal Y and a plasticizer. Moreover, in a case where the sound insulation layer is interposed between two protective layers, the resulting interlayer film for a laminated glass (hereafter, also referred to as a sound insulation interlayer film) can have excellent sound insulation properties. The sound insulation interlayer film is more specifically described in the following.

In the sound insulation interlayer film, the sound insulation layer imparts sound insulation properties. The sound insulation layer preferably contains the polyvinyl acetal X and a plasticizer.

The polyvinyl acetal X can be prepared by acetalization of polyvinyl alcohol with an aldehyde. The polyvinyl alcohol is commonly obtained by saponifying polyvinyl acetate.

The lower limit of the degree of polymerization of the polyvinyl alcohol is preferably 200, and the upper limit thereof is preferably 5,000. When the polyvinyl alcohol has an average degree of polymerization of 200 or more, a sound insulation interlayer film to be obtained can have better penetration resistance. When the polyvinyl alcohol has an average degree of polymerization of 5,000 or less, formability of a sound insulation layer can be ensured. Concerning the average degree of polymerization of the polyvinyl alcohol, the lower limit is more preferably 500 and the upper limit is more preferably 4,000.

The average degree of polymerization of the polyvinyl alcohol is obtained by a method in conformity with JIS K6726 "Testing methods for polyvinyl alcohol".

The lower limit of the carbon number of the aldehyde used for acetalization of the polyvinyl alcohol is preferably 4, and the upper limit thereof is preferably 6. When the aldehyde has a carbon number of 4 or more, a sound insulation layer to be obtained can stably contain a sufficient amount of a plasticizer. As a result, the sound insulation layer can exhibit excellent sound insulation properties. Moreover, bleeding out of the plasticizer can be prevented. When the aldehyde has a carbon number of 6 or less, synthesis of the polyvinyl acetal X can be facilitated, ensuring the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or lower, the sound insulation layer can contain a plasticizer in an amount needed for exhibiting sound insulation properties, and bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %. The hydroxy group content of the polyvinyl acetal X is a value in percentage of the mole fraction (mol %) obtained by dividing the amount of ethylene groups to which hydroxy groups are bonded by the total amount of ethylene groups of the main chain. The amount of ethylene groups to which hydroxy groups are bonded can be determined by measuring the amount of ethylene groups to which hydroxy groups are bonded in the polyvinyl acetal X by the method in conformity with JIS K6728 "Testing methods for polyvinyl butyral".

The lower limit of the acetal group content of the polyvinyl acetal X is preferably 60 mol %, and the upper limit thereof is preferably 85 mol %. When the polyvinyl acetal X has an acetal group content of 60 mol % or more, the sound insulation layer has higher hydrophobicity and can contain a plasticizer in an amount needed for exhibiting sound insulation properties. Moreover, bleeding out of the plasticizer and whitening can be prevented. When the polyvinyl acetal X has an acetal group content of 85 mol % or less, synthesis of the polyvinyl acetal X can be facilitated, ensuring the productivity. The lower limit of the acetal group content of the polyvinyl acetal X is more preferably 65 mol %, still more preferably 68 mol % or more.

The acetal group content can be obtained by measuring the amount of ethylene groups to which acetal groups are bonded in the polyvinyl acetal X by the method in conformity with JIS K6728 "Testing methods for polyvinyl butyral".

The lower limit of the acetyl group content of the polyvinyl acetal X is preferably 0.1 mol %, and the upper limit thereof is preferably 30 mol %. When the acetyl group content of the polyvinyl acetal X is 0.1 mol % or more, the sound insulation layer can contain a plasticizer in an amount needed for exhibiting sound insulation properties, and bleeding out of the plasticizer can be prevented. When the acetyl group content of the polyvinyl acetal X is 30 mol % or less, the sound insulation layer can have higher hydrophobicity, preventing whitening. The lower limit of the acetyl group content is more preferably 1 mol %, still more preferably 5 mol %, particularly preferably 8 mol %, and the upper limit thereof is more preferably 25 mol %, still more preferably 20 mol %. The acetyl group content is a value in percentage of the mole fraction (mol %) obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain.

The polyvinyl acetal X is preferably a polyvinyl acetal having an acetyl group content of 8 mol % or more or a polyvinyl acetal having an acetyl group content of less than 8 mol % and an acetal group content of 65 mol % or more because the sound insulation layer can readily contain a plasticizer in an amount needed for exhibiting sound insulation properties. Moreover, the polyvinyl acetal X is more preferably a polyvinyl acetal having an acetyl group content of 8 mol % or more or a polyvinyl acetal having an acetyl group content of less than 8 mol % and an acetal group content of 68 mol % or more.

The lower limit of the plasticizer content of the sound insulation layer based on 100 parts by mass of the polyvinyl acetal X is preferably 45 parts by mass, and the upper limit thereof is preferably 80 parts by mass. When the plasticizer content is 45 parts by mass or more, the sound insulation layer can exhibit high sound insulation properties. When the plasticizer content is 80 parts by mass or less, reduction in the transparency and adhesiveness of an interlayer film for a laminated glass to be obtained due to bleeding out of the plasticizer can be prevented. The lower limit of the plasticizer content is more preferably 50 parts by mass, still more preferably 55 parts by mass, and the upper limit thereof is more preferably 75 parts by mass, still more preferably 70 parts by mass.

In the case where the sound insulation layer has a rectangular cross-sectional shape in the thickness direction, the lower limit of the thickness is preferably 50 µm. Having a thickness of 50 µm or more, the sound insulation layer can exhibit enough sound insulation properties. The lower limit of the thickness of the sound insulation layer is more preferably 80 µm. The upper limit thereof is not particularly limited. In consideration of the thickness as an interlayer film for a laminated glass, the upper limit is preferably 300 µm.

The sound insulation layer may have one end and the other end on an opposite side of the one end, and may have a shape in which the thickness of the other end is greater than the thickness of the one end. The sound insulation layer preferably has a wedge portion in a cross-sectional shape in the thickness direction. In this case, the lower limit of the minimum thickness of the sound insulation layer is preferably 50 µm. Having the minimum thickness of 50 µm or more, the sound insulation layer can exhibit enough sound insulation properties. The lower limit of the minimum thickness of the sound insulation layer is more preferably 80 µm, still more preferably 100 µm. The upper limit of the maximum thickness of the sound insulation layer is not particularly limited. The upper limit is preferably 300 µm in consideration of the thickness as an interlayer film for a laminated glass. The upper limit of the maximum thickness of the sound insulation layer is more preferably 220 µm.

The protective layer prevents bleeding out of the plasticizer contained in a large amount in the sound insulation layer to prevent reduction in the adhesiveness between the interlayer film for a laminated glass and the glass plate, and imparts penetration resistance to the interlayer film for a laminated glass.

The protective layer preferably contains, for example, a plasticizer and the polyvinyl acetal Y, more preferably a plasticizer and the polyvinyl acetal Y having a higher hydroxy group content than the polyvinyl acetal X.

The polyvinyl acetal Y can be prepared by acetalization of polyvinyl alcohol with an aldehyde. The polyvinyl alcohol is commonly obtained by saponifying polyvinyl acetate.

The lower limit of the average degree of polymerization of the polyvinyl alcohol is preferably 200, and the upper limit thereof is preferably 5,000. When the polyvinyl alcohol has an average degree of polymerization of 200 or more, an interlayer film for a laminated glass to be obtained can have better penetration resistance. When the polyvinyl alcohol has an average degree of polymerization of 5,000 or less, formability of a protective layer can be ensured. Concerning the average degree of polymerization of the polyvinyl alcohol, the lower limit is more preferably 500 and the upper limit is more preferably 4,000.

The lower limit of the carbon number of the aldehyde used for acetalization of the polyvinyl alcohol is preferably 3, and the upper limit thereof is preferably 4. When the aldehyde has a carbon number of 3 or more, an interlayer film for a laminated glass to be obtained has higher penetration resistance. When the aldehyde has a carbon number of 4 or less, productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol %, and the lower limit thereof is preferably 28 mol %. When the polyvinyl acetal Y has a hydroxy group content of 33 mol % or lower, whitening of an interlayer film for a laminated glass to be obtained can be prevented. When the polyvinyl acetal Y has a hydroxy group content of 28 mol % or higher, an interlayer film for a laminated glass to be obtained has higher penetration resistance.

The lower limit of the acetal group content of the polyvinyl acetal Y is preferably 60 mol %, and the upper limit thereof is preferably 80 mol %. When the acetal group content is 60 mol % or more, a protective layer to be obtained can contain a plasticizer in an amount needed for exhibiting enough penetration resistance. When the acetal group content is 80 mol % or less, the adhesion force between the protective layer and the glass plate can be ensured. The lower limit of the acetal group content is more preferably 65 mol %, and the upper limit thereof is more preferably 69 mol %.

The upper limit of the acetyl group content of the polyvinyl acetal Y is preferably 7 mol %. When the polyvinyl acetal Y has an acetyl group content of 7 mol % or less, a protective layer to be obtained can have higher hydrophobicity, thereby preventing whitening. The upper limit of the acetyl group content is more preferably 2 mol %, and the lower limit thereof is preferably 0.1 mol %. The hydroxy group contents, acetal group contents, and acetyl group contents of the polyvinyl acetals A, B, and Y can be measured by the same methods as those in the case of the polyvinyl acetal X.

The lower limit of the plasticizer content of the protective layer based on 100 parts by mass of the polyvinyl acetal Y is preferably 20 parts by mass, and the upper limit thereof is preferably 45 parts by mass. When the plasticizer content is 20 parts by mass or more, the penetration resistance can be ensured. When the plasticizer content is 45 parts by mass or less, bleeding out of the plasticizer can be prevented, thereby preventing reduction in the transparency and adhesiveness of an interlayer film for a laminated glass to be obtained. The lower limit of the plasticizer content is more preferably 30 parts by mass, still more preferably 35 parts by mass, and the upper limit thereof is more preferably 43 parts by mass, still more preferably 41 parts by mass. For better sound insulation properties of a laminated glass to be obtained, the plasticizer content of the protective layer is preferably lower than the plasticizer content of the sound insulation layer.

For higher sound insulation properties of a laminated glass to be obtained, the hydroxy group content of the polyvinyl acetal Y is preferably higher than the hydroxy group content of the polyvinyl acetal X, more preferably higher by 1 mol % or more, still more preferably higher by 5 mol % or more, particularly preferably higher by 8 mol % or more. Adjustment of the hydroxy group contents of the polyvinyl acetal X and polyvinyl acetal Y enables control of the plasticizer contents of the sound insulation layer and the protective layer, so that the sound insulation layer has a lower glass transition temperature. As a result, a laminated glass to be obtained has higher sound insulation properties.

For still higher sound insulation properties of a laminated glass to be obtained, the plasticizer content of the sound insulation layer (hereafter, also referred to as content X) based on 100 parts by mass of the polyvinyl acetal X is preferably higher than the plasticizer content of the protective layer (hereafter, also referred to as content Y) based on 100 parts by mass of the polyvinyl acetal Y, more preferably higher by 5 parts by mass or more, still more preferably higher by 15 parts by mass or more, particularly preferably higher by 20 parts by mass or more. Adjustment of the content X and content Y lowers the glass transition temperature of the sound insulation layer. As a result, a laminated glass to be obtained has still higher sound insulation properties.

The protective layer may have any thickness, provided that it can fulfill the role as the protective layer. In a case where protrusions and recesses are formed on the protective layer, the protective layer is preferably as thick as possible to prevent the protrusions and recesses from being transferred to the interface with the sound insulation layer directly in contact with the protective layer. Specifically, the lower limit of the thickness of the protective layer having a rectangular cross-sectional shape is preferably 100 µm, more preferably 300 µm, still more preferably 400 µm, particularly preferably 450 µm. The upper limit of the thickness of the protective layer is not particularly limited. In order to ensure the thickness enough to achieve sufficient sound insulation properties, the upper limit of the protective layer is practically about 500 µm.

The protective layer may have one end and the other end on an opposite side of the one end, and may have a shape in which the thickness of the other end is greater than the thickness of the one end. The protective layer preferably has a wedge portion in a cross-sectional shape in the thickness direction. The protective layer may have any thickness, provided that it can fulfill the role as the protective layer. In a case where protrusions and recesses are formed on the protective layer, the protective layer is preferably as thick as possible to prevent the protrusions and recesses from being transferred to the interface with the sound insulation layer directly in contact with the protective layer. Specifically, the lower limit of the minimum thickness of the protective layer is preferably 100 µm, more preferably 300 µm, still more preferably 400 µm, particularly preferably 450 µm. The upper limit of the maximum thickness of the protective layer is not particularly limited. In order to ensure the thickness enough to achieve sufficient sound insulation properties, the upper limit of the protective layer is practically about 1,000 µm, preferably 800 µm.

The interlayer film for a laminated glass of the present invention may have one end and the other end on an opposite side of the one end. The one end and the other end are end portions on both sides facing each other in the interlayer film. In the interlayer film for a laminated glass of the present invention, the thickness of the other end is preferably greater than the thickness of the one end. A laminated glass prepared using the interlayer film for a laminated glass of the present invention having such a shape where the thickness is different between one end and the other end can be suitably used in a head-up display. In this case, occurrence of double images can be effectively suppressed. The interlayer film for a laminated glass of the present invention may have a wedge cross-sectional shape. Provided that the interlayer film for a laminated glass has a wedge cross-sectional shape, a head-up display can perform image display without occurrence of double images by adjusting wedge angle θ of the wedge shape according to the mounting angle of the laminated glass. The lower limit of the wedge angle θ is preferably 0.1 mrad, more preferably 0.2 mrad, still more preferably 0.3 mrad, and the upper limit thereof is preferably 1 mrad, more preferably 0.9 mrad, from the viewpoint of further suppressing the occurrence of double images. In the case of producing the interlayer film for a laminated glass having a wedge cross-sectional shape, for example, by extrusion molding of a resin composition using an extruder, the produced interlayer film may have a shape having the minimum thickness in a region slightly inward from the end on the thinner side (specifically, when the distance from one end to the other end is defined as X, a region within a distance of 0X to 0.2X inward from the end on the thinner side) and having the maximum thickness in a region slightly inward from the end on the thicker side (specifically, when the distance from one end to the other end is defined as X, a region within a distance of 0X to 0.2X inward from the end on the thicker side). Such a shape is herein also included in the wedge shape.

The sound insulation interlayer film may be produced by any method. The sound insulation interlayer film can be produced, for example, by a method of forming the sound insulation layer and protective layer as sheet materials by a conventional film-forming method such as extrusion, calendering, or pressing and then stacking the obtained sheet materials.

The present invention also encompasses a laminated glass including the interlayer film for a laminated glass of the present invention interposed between a pair of glass plates.

The glass plate may be a commonly used transparent glass plate. Examples thereof include inorganic glass plates such as float glass plates, polished glass plates, figured glass plates, meshed glass plates, wired glass plates, colored glass plates, heat-absorbing glass plates, heat-reflecting glass plates, and green glass plates. An ultraviolet shielding glass plate including an ultraviolet shielding coat layer on a glass surface may also be used. Moreover, also usable are organic plastic plates made of polyethylene terephthalate, polycarbonate, polyacrylate, or the like.

The glass plates may include two or more types of glass plates. For example, the laminated glass may be a laminated glass including the interlayer film for a laminated glass of the present invention between a transparent float glass plate and a colored glass plate such as a green glass plate. The glass plates may include two or more glass plates with different thicknesses.

Advantageous Effects of Invention

The present invention can provide an interlayer film for a laminated glass which is easily peelable without autohesion even after storage in a stacked state, and a laminated glass prepared using the interlayer film for a laminated glass.

DESCRIPTION OF EMBODIMENTS

Figure 1:
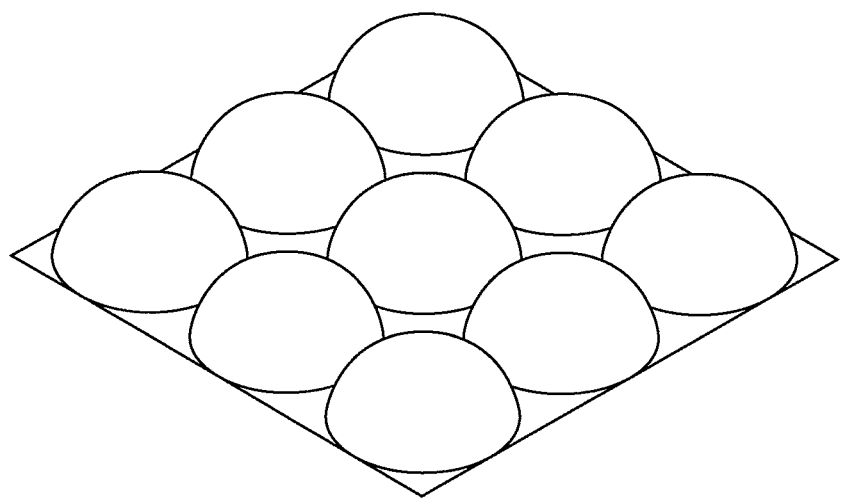
FIG. 1 is a view schematically illustrating an exemplary interlayer film for a laminated glass having a large number of spherical protrusions on a surface.
Figure 2:
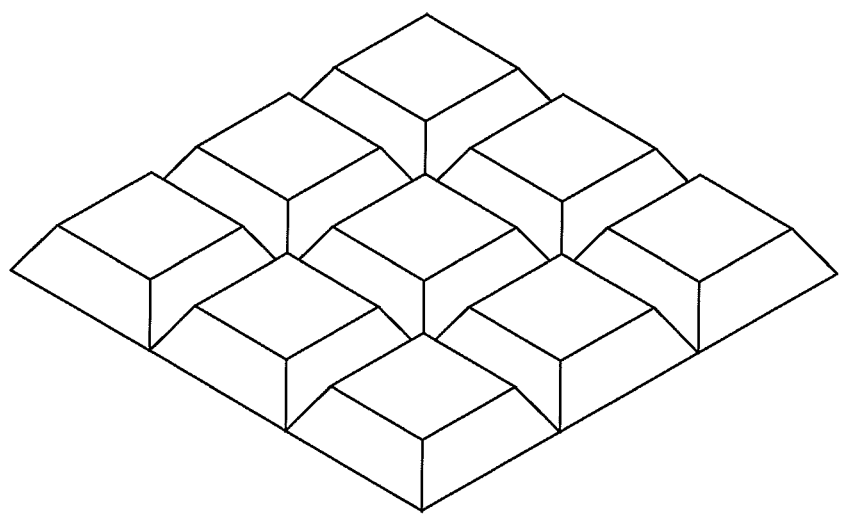
FIG. 2 is a view schematically illustrating an exemplary interlayer film for a laminated glass having a large number of blockish protrusions on a surface.
Figure 3:
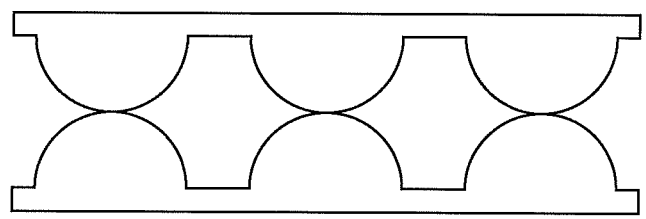
FIG. 3 is a view schematically illustrating the case where interlayer films for a laminated glass each having protrusions on a surface are stacked.
Figure 3:
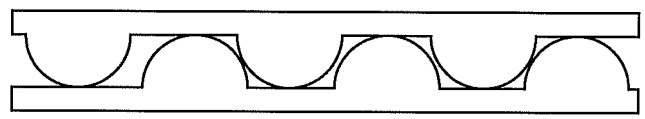
Figure 3:
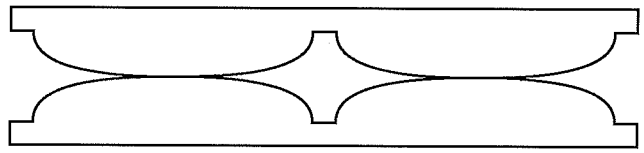

Embodiments of the present invention are more specifically described in the following with reference to, but not limited to, examples.

Example 1

(1) Preparation of an Interlayer Film for a Laminated Glass

Polyvinyl alcohol having an average degree of polymerization of 1,700 was acetalized with n-butyraldehyde to give polyvinyl butyral (PVB, acetyl group content: 1 mol %, butyral group content: 69.1 mol %, hydroxy group content: 30 mol %). To 100 parts by mass of the polyvinyl butyral was added 40 parts by mass of triethylene glycol-di-2-ethylhexanoate (3GO) as a plasticizer, and kneaded well with a mixing roll to give a resin composition.

The obtained resin composition was extruded using an extruder to provide a resin film having a thickness of 760 µm. A fine emboss pattern was formed on surfaces of this resin film according to the embossing method with controlled melt fracture by setting the distance from the die to the surface of a cooling water tank to 100 mm (first step).

A large number of spherical protrusions were formed on the surfaces of the obtained resin film by the following procedure.

A pair of rolls including a metal roll having a surface processed with a mill and a rubber roll having a JIS hardness of 45 to 75 was used as a device for transferring a pattern of protrusions and recesses. The resin film after the first step was passed through the device for transferring a pattern of protrusions and recesses, thereby forming a large number of spherical protrusions on one of the surfaces. The transferring conditions employed here were a temperature of the interlayer film for a laminated glass of 70° C., a temperature of the rolls of 140° C., a linear velocity of 10 m/min, and a pressure adjusted so as to produce the desired roughness.

Then, the same operations for formation of a large number of spherical protrusions were performed on the other surface of the resin film to obtain an interlayer film for a laminated glass.

(2) Measurement of Surface State of the Interlayer Film for a Laminated Glass (2-1) Rz Value Measurement The ten-point average roughness (Rz) on both surfaces of the obtained interlayer film was measured by the method in conformity with JIS B-0601 (1994). The measuring instrument used was "Surfcorder SE300" available from Kosaka Laboratory Ltd. The measurement was performed using a stylus profilometer at a cut-off value of 2.5 mm, a standard length of 2.5 mm, an evaluation length of 12.5 mm, and a measurement rate of 0.5 mm/s, with a stylus having a tip radius of 2 µm and a tip angle of 60°. The measurement environment was 23° C. and 30 RH %. The stylus was moved in a direction perpendicular to the groove direction of engraved lines.

(2-2) Apex Sa Value Measurement

The surface of the interlayer film for a laminated glass was measured using a three-dimensional white light interference microscope (ContourGT-K available from Bruker AXS GmbH) in a 1 mm square field of view at an objective lens magnification of 115 times, an internal lens magnification of 0.5 times, and a resolution set to Full resolution to obtain images. Analytical software "Vision64" included in the apparatus was used in image processing. Conditions for the planarization and noise removal processes involved performing the first processing "Terms Removal (F-Operator)" on Analysis Toolbox under the analysis condition "Tilt only (Plane Fit)", performing the second processing "Statistic Filter" under the analysis conditions "Filter type: Sigma" and "Filter size: 5", and further performing the processing "data Restore" by selecting the analysis condition "Legacy", selecting Restore Edge condition, and setting Iteration condition to a value for sufficient data complement. In the third processing "Mask data" to extract image data on only the protrusions, the Height threshold of a histogram displayed under the analysis condition Histogram Mask was determined to be between 0.2 and −0.2 µm, and data on height regions equal to or more than the threshold was extracted under the condition "Mask: Left". The successful setting of the threshold to between 0.2 and −0.2 µm was confirmed from the histogram display of the data after the extraction. In order to remove coarse protrusions and recesses, the fourth processing "Gaussian Regression Filter" was performed under the analysis conditions "Short wavelength pass, order: 2, Type: Regular, and Long wavelength cutoff: 0.025 mm", and advance setup was performed under initial conditions. The image data after the first processing through the third processing was subjected to the fourth processing "S parameters-height" under the analysis condition "Removal tilt: True". The resulting "Sa" was used as the arithmetical mean height Sa value.

(2-3) Arrangement Density Measurement of Protrusions

The surface of the interlayer film for a laminated glass was measured using a three-dimensional white light interference microscope (ContourGT-K available from Bruker AXS GmbH) in a 4 mm square field of view at an objective lens magnification of 50 times and an internal lens magnification of 0.5 times to obtain images. In this operation, light quantity and threshold were set as appropriate so as to minimize noise in the measurement. Then, analytical software "Vision64" included in the apparatus was used in image processing. Conditions for the planarization and noise removal processes involved performing the first processing "Terms Removal (F-Operator)" on Analysis Toolbox under the analysis condition "Tilt only (Plane Fit)" and performing the second processing "Statistic Filter" under the analysis conditions "Filter type: Sigma" and "Filter size: 5". The third processing "Multi Region" to extract the areas of only the protrusions was performed under analysis conditions involving Zero level: "Background", Region Finding Routine: "By Threshold", threshold: 1 µm, and Region Finding option including "minimum Region size": 5,000 µm$^2$ and "Region Level": Peaks with "Exclude Edge Region" not selected. The number of the protrusions extracted by the third processing was counted to calculate the arrangement density of the protrusions per mm$^2$. Protrusions that were not wholly displayed in an image were counted as ½.

(2-4) Measurement of Area Ratio of Protrusions to Surface

The measurement employed a three-dimensional white light interference microscope (ContourGT-K available from Bruker AXS GmbH). The surface of the interlayer film for a laminated glass was measured in a 4 mm square field of view at an objective lens magnification of 50 times and an internal lens magnification of 0.5 times to obtain images. In this operation, light quantity and threshold were set as appropriate so as to minimize noise in the measurement. Then, analytical software "Vision64" included in the apparatus was used in image processing. Conditions for the planarization and noise removal processes involved performing the first processing "Terms Removal (F-Operator)" on Analysis Toolbox under the analysis condition "Tilt only (Plane Fit)" and performing the second processing "Statistic Filter" under the analysis conditions "Filter type: Sigma" and "Filter size: 5". The third processing "Multi Region" to extract the areas of only the protrusions was performed under analysis conditions involving Zero level: "Background", Region Finding Routine: "By Threshold", threshold: 1 µm, and Region Finding option including "minimum Region size": 5,000 µm$^2$ and "Region Level": Peaks with "Exclude Edge Region" not selected. The areas of the protrusions obtained by the third processing were totalized to calculate the area ratio of the protrusions per mm$^2$.

Examples 2 to 6 and Comparative Examples 1 to 5

An interlayer film for a laminated glass was produced by the method in conformity with Example 1, except that the pattern on the metal roll and the transferring conditions were changed to attain the surface state as shown in Table 1 or 2.

Examples 7 and 8

An interlayer film for a laminated glass was produced by the method in conformity with Example 1, except that the distance from the die to the surface of a cooling water tank was set to 50 mm, and the pattern on the metal roll and the transferring conditions were changed to attain the surface state as shown in Table 1.

Comparative Example 6

An interlayer film for a laminated glass was produced by the method in conformity with Example 1, except that the distance from the die to the surface of a cooling water tank was set to 300 mm, and the pattern on the metal roll and the transferring conditions were changed to attain the surface state as shown in Table 2.

Examples 9 to 16

An interlayer film for a laminated glass was produced by the method in conformity with Example 1, except that the pattern on the metal roll and the transferring conditions were changed to attain the surface state as shown in Table 3.

Examples 17 and 18

An interlayer film for a laminated glass was produced by the method in conformity with Example 1, except that the composition of the polyvinyl butyral used was changed as shown in Table 3, and the pattern on the metal roll and the transferring conditions were changed to attain the surface state as shown in Table 3.

Example 19

(Preparation of a Resin Composition for a Protective Layer)

Polyvinyl alcohol having an average degree of polymerization of 1,700 was acetalized with n-butyraldehyde to give polyvinyl butyral (PVB, acetyl group content: 1 mol %, butyral group content: 69 mol %, hydroxy group content: 30 mol %). To 100 parts by mass of the polyvinyl butyral were added 36 parts by mass of triethylene glycol-di-2-ethylhexanoate (3GO) as a plasticizer. The mixture was kneaded well with a mixing roll to give a resin composition for a protective layer.

(Preparation of a Resin Composition for an Intermediate Layer)

Polyvinyl alcohol having an average degree of polymerization of 3,000 was acetalized with n-butyraldehyde to give polyvinyl butyral (PVB, acetyl group content: 12.5 mol %, butyral group content: 64.2 mol %, hydroxy group content: 23.3 mol %). To 100 parts by mass of the polyvinyl butyral were added 76.5 parts by mass of triethylene glycol-di-2-ethylhexanoate (3GO) as a plasticizer, and the mixture was mixed well with a mixing roll to give a resin composition for an intermediate layer.

(Production of an Interlayer Film for a Laminated Glass)

The obtained resin composition for an intermediate layer and resin composition for a protective layer were co-extruded using a co-extruder to form an interlayer film for a laminated glass having a triple layer structure including a first protective layer made of the resin composition for a protective layer, an intermediate layer made of the resin composition for an intermediate layer, and a second protective layer made of the resin composition for a protective layer, stacked in the stated order. The extrusion conditions were set such that the first and second protective layers each had a thickness of 350 μm and the intermediate layer had a thickness of 100 μm in an interlayer film for a laminated glass to be obtained after formation of protrusions and recesses.

Then, an interlayer film for a laminated glass was produced by the method in conformity with Example 1, except that the pattern on the metal roll and the transferring conditions were changed to attain the surface state as shown in Table 4.

Examples 20 to 24 and Comparative Examples 7 to 8

An interlayer film for a laminated glass was produced by the method in, conformity with Example 1, except that the pattern on the metal roll and the transferring conditions were changed to attain the surface state as shown in Table 4 or 5.
(Evaluation)

In relation to the interlayer film for a laminated glass obtained in each of the examples and comparative examples, evaluation was conducted by the following methods. The results are shown in Tables 1 to 5.
(1) Evaluation of Autohesion Force The interlayer film for a laminated glass obtained in each of the examples and comparative examples was cut into a size of 150 mm in length and 150 mm in width to obtain a test specimen. Two test specimens thus obtained were stacked, and a glass plate (weight: 5.8 kg) was placed thereon with a release paper as a means of releasing treatment interposed therebetween. The release paper was prepared by silicone coating of a base paper. In this state, the test specimens were left for 168 hours in a constant temperature and humidity bath adjusted to a temperature of 23° C. and a humidity of 30%.

Then, 2 cm end portions of the two test specimens were peeled from each other, and the end portions of the two test specimens were fixed with 15 cm wide grippers, respectively. The 180° peel strength between the two test specimens was measured in conformity with JIS K-6854-3 (1999) at a peel rate of 50 cm/min in an environment of a temperature of 23° C. and a humidity of 30%, and the average peel strength (N/cm) of a peeling distance from 50 mm to 200 mm was calculated. The other conditions conformed to JIS K-6854-3 (1999). The obtained value was used as the autohesion force of the interlayer film for a laminated glass.

For peeling by a machine transporting interlayer films for a laminated glass or by human power, the autohesion force is preferably 0.5 N/cm or less, more preferably 0.4 N/cm or less, particularly preferably 0.3 N/cm or less.
(2) Evaluation of Deaeration Properties The interlayer film for a laminated glass obtained in each of the examples and comparative examples was stored for three hours in an environment of 23° C. and 30% humidity and then sandwiched between two clear glass plates (30 cm in length×30 cm in width×2.5 mm in thickness), and the portions of the film protruding from the glass plates were cut off. The laminated glass structure (laminate) thus obtained was transferred into a rubber bag, which was then connected to a vacuum suction device. The rubber bag was heated so that the temperature of the laminated glass structure (laminate) (preliminary pressure bonding temperature) reached 70° C., while being held under a reduced pressure of −30 kPa (absolute pressure: 16 kPa) for 10 minutes. Thereafter, the pressure was returned to atmospheric pressure, whereby the preliminary pressure bonding was completed. The surface temperature of the glass plates at the start of the preliminary pressure bonding (deaeration onset temperature) was set to 60° C.

The preliminarily pressure bonded laminated glass structure (laminate) was placed in an autoclave, and held at a temperature of 140° C. and a pressure of 1,300 kPa for 10 minutes. The temperature was lowered to 50° C. and the pressure was returned to atmospheric pressure, whereby the final pressure bonding was completed. A laminated glass was thus prepared.

The obtained laminated glass was heated in an oven of 140° C. for two hours. The appearance of the laminated glass was visually observed after the laminated glass was taken out of the oven and allowed to cool for three hours. Twenty laminated glasses were tested for each example. The number of laminated glass samples having foaming (bubbles) was examined, and the deaeration properties were evaluated according to the following criteria.
○ (Good): Five or less samples had foaming.
x (Poor): More than 5 samples had foaming.

TABLE 1

| | | | Example 1 | Example 2 | Example 3 | Example 4 | Example 5 | Example 6 | Example 7 | Example 8 |
|---|---|---|---|---|---|---|---|---|---|---|
| Composition of interlayer film | PVB | Average degree of polymerization | 1700 | 1700 | 1700 | 1700 | 1700 | 1700 | 1700 | 1700 |
| | | Degree of butyralization (mol %) | 69 | 69 | 69 | 69 | 69 | 69 | 69 | 69 |
| | | Degree of acetylation (mol %) | 1 | 1 | 1 | 1 | 1 | 1 | 1 | 1 |
| | | Hydroxy group content (mol %) | 30 | 30 | 30 | 30 | 30 | 30 | 30 | 30 |
| | | Amount (parts by mass) | 100 | 100 | 100 | 100 | 100 | 100 | 100 | 100 |
| | Plasticizer | Type | 3GO | 3GO | 3GO | 3GO | 3GO | 3GO | 3GO | 3GO |
| | | Amount (parts by mass) | 40 | 40 | 40 | 40 | 40 | 40 | 40 | 40 |
| Surface pattern of interlayer film | First surface | Ten-point average roughness Rz (μm) | 50 | 43 | 35 | 30 | 40 | 42 | 55 | 48 |
| | | Apex Sa (nm) | 279 | 279 | 279 | 279 | 279 | 279 | 500 | 500 |
| | | Arrangement density of protrusions (protrusions/mm$^2$) | 4.6 | 28.9 | 4.6 | 12.8 | 4.6 | 28.9 | 4.6 | 28.9 |
| | | Area ratio of protrusions (%) | 61.0 | 61.0 | 44.4 | 44.4 | 16.0 | 16.0 | 44.4 | 44.4 |

TABLE 1-continued

|  |  |  | Example 1 | Example 2 | Example 3 | Example 4 | Example 5 | Example 6 | Example 7 | Example 8 |
|---|---|---|---|---|---|---|---|---|---|---|
|  | Second surface | Ten-point average roughness Rz (μm) | 48 | 40 | 42 | 29 | 38 | 41 | 53 | 45 |
|  |  | Apex Sa (nm) | 244.5 | 244.5 | 244.5 | 244.5 | 244.5 | 244.5 | 488 | 488 |
|  |  | Arrangement density of protrusions (protrusions/mm²) | 4.5 | 28.9 | 4.5 | 12.9 | 4.5 | 28.9 | 4.5 | 28.9 |
|  |  | Area ratio of protrusions (%) | 61.0 | 61.0 | 44.4 | 44.4 | 16.0 | 16.0 | 44.4 | 44.4 |
| Evaluation | Autohesion force (N/cm) |  | 0.49 | 0.49 | 0.49 | 0.39 | 0.49 | 0.30 | 0.30 | 0.25 |
|  | Deaeration properties |  | ○ | ○ | ○ | ○ | ○ | ○ | ○ | ○ |

TABLE 2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Composition of interlayer film | PVB | Average degree of polymerization | 1700 | 1700 | 1700 | 1700 | 1700 | 1700 |
|  |  | Degree of butyralization (mol %) | 69 | 69 | 69 | 69 | 69 | 69 |
|  |  | Degree of acetylation (mol %) | 1 | 1 | 1 | 1 | 1 | 1 |
|  |  | Hydroxy group content (mol %) | 30 | 30 | 30 | 30 | 30 | 30 |
|  |  | Amount (parts by mass) | 100 | 100 | 100 | 100 | 100 | 100 |
|  | Plasticizer | Type | 3GO | 3GO | 3GO | 3GO | 3GO | 3GO |
|  |  | Amount (parts by mass) | 40 | 40 | 40 | 40 | 40 | 40 |
| Surface pattern of interlayer film | First surface | Ten-point average roughness Rz (μm) | 45 | 40 | 35 | 30 | 50 | 38 |
|  |  | Apex Sa (nm) | 279 | 279 | 279 | 279 | 279 | 154 |
|  |  | Arrangement density of protrusions (protrusions/mm²) | 4.6 | 9.4 | 28.9 | 2.2 | 2.2 | 4.6 |
|  |  | Area ratio of protrusions (%) | 76.8 | 76.8 | 76.8 | 61.0 | 44.4 | 11.1 |
|  | Second surface | Ten-point average roughness Rz (μm) | 44 | 42 | 33 | 32 | 48 | 39 |
|  |  | Apex Sa (nm) | 244.5 | 244.5 | 244.5 | 244.5 | 244.5 | 135 |
|  |  | Arrangement density of protrusions (protrusions/mm²) | 4.5 | 12.9 | 28.9 | 2.2 | 2.2 | 4.5 |
|  |  | Area ratio of protrusions (%) | 76.8 | 76.8 | 76.8 | 61.0 | 44.4 | 11.1 |
| Evaluation | Autohesion force (N/cm) |  | 0.72 | 0.71 | 0.73 | 0.78 | 0.75 | 1.95 |
|  | Deaeration properties |  | x | x | x | ○ | ○ | ○ |

TABLE 3

|  |  |  | Example 9 | Example 10 | Example 11 | Example 12 | Example 13 | Example 14 |
|---|---|---|---|---|---|---|---|---|
| Composition of interlayer film | PVB | Average degree of polymerization | 1700 | 1700 | 1700 | 1700 | 1700 | 1700 |
|  |  | Degree of butyralization (mol %) | 69 | 69 | 69 | 69 | 69 | 69 |
|  |  | Degree of acetylation (mol %) | 1 | 1 | 1 | 1 | 1 | 1 |
|  |  | Hydroxy group content (mol %) | 30 | 30 | 30 | 30 | 30 | 30 |
|  |  | Amount (parts by mass) | 100 | 100 | 100 | 100 | 100 | 100 |

TABLE 3-continued

|  |  |  |  |  |  |  |  |  |
|---|---|---|---|---|---|---|---|---|
|  | | Plasticizer | Type | 3GO | 3GO | 3GO | 3GO | 3GO | 3GO |
|  | | | Amount (parts by mass) | 40 | 40 | 40 | 40 | 40 | 40 |
| Surface pattern of interlayer film | First surface | | Ten-point average roughness Rz (μm) | 36 | 38 | 38 | 33 | 30 | 33 |
| | | | Apex Sa (nm) | 270 | 260 | 250 | 270 | 255 | 279 |
| | | | Arrangement density of protrusions (protrusions/mm²) | 35.3 | 51.8 | 79.0 | 35.0 | 52.0 | 4.5 |
| | | | Area ratio of protrusions (%) | 60.0 | 59.0 | 58.0 | 42.0 | 41.0 | 27.0 |
| | Second surface | | Ten-point average roughness Rz (μm) | 38 | 34 | 37 | 29 | 28 | 33 |
| | | | Apex Sa (nm) | 224 | 255 | 220 | 225 | 230 | 240 |
| | | | Arrangement density of protrusions (protrusions/mm²) | 35.0 | 51.5 | 77.5 | 37.0 | 51.8 | 4.5 |
| | | | Area ratio of protrusions (%) | 59.0 | 58.0 | 57.2 | 44.0 | 42.5 | 26.2 |
| Evaluation | Autohesion force (N/cm) | | | 0.46 | 0.44 | 0.36 | 0.29 | 0.24 | 0.40 |
| | Deaeration properties | | | ○ | ○ | ○ | ○ | ○ | ○ |

|  |  |  |  | Example 15 | Example 16 | Example 17 | Example 18 |
|---|---|---|---|---|---|---|---|
| Composition of interlayer film | | PVB | Average degree of polymerization | 1700 | 1700 | 1700 | 1700 |
| | | | Degree of butyralization (mol %) | 69 | 69 | 69.9 | 68.5 |
| | | | Degree of acetylation (mol %) | 1 | 1 | 1.1 | 0.5 |
| | | | Hydroxy group content (mol %) | 30 | 30 | 29 | 31 |
| | | | Amount (parts by mass) | 100 | 100 | 100 | 100 |
| | | Plasticizer | Type | 3GO | 3GO | 3GO | 3GO |
| | | | Amount (parts by mass) | 40 | 40 | 40 | 40 |
| Surface pattern of interlayer film | First surface | | Ten-point average roughness Rz (μm) | 34 | 40 | 45 | 42 |
| | | | Apex Sa (nm) | 255 | 279 | 250 | 245 |
| | | | Arrangement density of protrusions (protrusions/mm²) | 35.3 | 35.0 | 4.5 | 4.5 |

TABLE 3-continued

|  |  |  |  |  |  |  |
|---|---|---|---|---|---|---|
|  |  | Area ratio of protrusions (%) | 26.5 | 15.3 | 60.0 | 60.5 |
|  | Second surface | Ten-point average roughness Rz (μm) | 40 | 36 | 42 | 43 |
|  |  | Apex Sa (nm) | 230 | 240 | 255 | 260 |
|  |  | Arrangement density of protrusions (protrusions/mm²) | 35.0 | 35.3 | 4.5 | 4.5 |
|  |  | Area ratio of protrusions (%) | 27.5 | 15.5 | 60.0 | 61.0 |
| Evaluation |  | Autohesion force (N/cm) | 0.21 | 0.27 | 0.53 | 0.49 |
|  |  | Deaeration properties | ○ | ○ | ○ | ○ |

TABLE 4

|  |  |  | Example 19 | Example 20 | Example 21 | Example 22 |
|---|---|---|---|---|---|---|
| First and second protective layers | PVB | Average degree of polymerization | 1700 | 1700 | 1700 | 1700 |
|  |  | Degree of butyralization (mol %) | 69 | 69 | 69 | 69 |
|  |  | Degree of acetylation (mol %) | 1 | 1 | 1 | 1 |
|  |  | Hydroxy group content (mol %) | 30 | 30 | 30 | 30 |
|  |  | Amount (parts by mass) | 100 | 100 | 100 | 100 |
|  | Plasticizer | Type | 3GO | 3GO | 3GO | 3GO |
|  |  | Amount (parts by mass) | 36 | 36 | 36 | 36 |
|  | Structure | Thickness (μm) | 350 | 350 | 350 | 350 |
| Intermediate layer | PVB | Average degree of polymerization | 3000 | 3000 | 2300 | 1700 |
|  |  | Degree of butyralization (mol %) | 64.2 | 64.2 | 64.2 | 64.2 |
|  |  | Degree of acetylation (mol %) | 12.5 | 12.5 | 12.5 | 12.5 |
|  |  | Hydroxy group content (mol %) | 23.3 | 23.3 | 23.3 | 23.3 |
|  |  | Amount (parts by mass) | 100 | 100 | 100 | 100 |
|  | Plasticizer | Type | 3GO | 3GO | 3GO | 3GO |
|  |  | Amount (parts by mass) | 76.5 | 76.5 | 76.5 | 76.5 |
|  | Structure | Thickness (μm) | 100 | 100 | 100 | 100 |
| Whole interlayer film | Structure | Structure | First protective layer/intermediate layer/second protective layer | First protective layer/intermediate layer/second protective layer | First protective layer/intermediate layer/second protective layer | First protective layer/intermediate layer/second protective layer |
|  |  | Thickness (μm) | 800 | 800 | 800 | 800 |
| Surface pattern of interlayer film | First surface | Ten-point average roughness Rz (μm) | 35 | 30 | 32 | 33 |
|  |  | Apex Sa (nm) | 253 | 253 | 250 | 268 |
|  |  | Arrangement density of protrusions (protrusions/mm²) | 4.6 | 12.8 | 12.8 | 12.8 |
|  |  | Area ratio of protrusions (%) | 44.4 | 45.0 | 44.0 | 42.0 |
|  | Second surface | Ten-point average roughness Rz (μm) | 42 | 29 | 32 | 32 |
|  |  | Apex Sa (nm) | 224 | 220 | 235 | 239 |
|  |  | Arrangement density of protrusions (protrusions/mm²) | 4.5 | 12.9 | 12.9 | 12.9 |
|  |  | Area ratio of protrusions (%) | 44.4 | 44.0 | 43.9 | 44.2 |

TABLE 4-continued

|  |  | Example 19 | Example 20 | Example 21 | Example 22 |
|---|---|---|---|---|---|
| Evaluation | Autohesion force (N/cm) | 0.53 | 0.42 | 0.43 | 0.43 |
|  | Deaeration properties | ○ | ○ | ○ | ○ |

TABLE 5

|  |  |  | Example 23 | Example 24 | Comparative Example 7 | Comparative Example 8 |
|---|---|---|---|---|---|---|
| First and second protective layers | PVB | Average degree of polymerization | 1700 | 1700 | 1700 | 1700 |
|  |  | Degree of butyralization (mol %) | 69.9 | 68.5 | 69 | 69 |
|  |  | Degree of acetylation (mol %) | 1.1 | 0.5 | 1 | 1 |
|  |  | Hydroxy group content (mol %) | 29 | 31 | 30 | 30 |
|  |  | Amount (parts by mass) | 100 | 100 | 100 | 100 |
|  | Plasticizer | Type | 3GO | 3GO | 3GO | 3GO |
|  |  | Amount (parts by mass) | 39 | 36 | 36 | 36 |
|  | Structure | Thickness (μm) | 350 | 350 | 350 | 350 |
| Intermediate layer | PVB | Average degree of polymerization | 2300 | 2300 | 3000 | 3000 |
|  |  | Degree of butyralization (mol %) | 77.8 | 67 | 64.2 | 64.2 |
|  |  | Degree of acetylation (mol %) | 1.5 | 8 | 12.5 | 12.5 |
|  |  | Hydroxy group content (mol %) | 20.7 | 25 | 23.3 | 23.3 |
|  |  | Amount (parts by mass) | 100 | 100 | 100 | 100 |
|  | Plasticizer | Type | 3GO | 3GO | 3GO | 3GO |
|  |  | Amount (parts by mass) | 79 | 75 | 76.5 | 76.5 |
|  | Structure | Thickness (μm) | 100 | 100 | 100 | 100 |
| Whole interlayer film | Structure | Structure | First protective layer/intermediate layer/second protective layer | First protective layer/intermediate layer/second protective layer | First protective layer/intermediate layer/second protective layer | First protective layer/intermediate layer/second protective layer |
|  |  | Thickness (μm) | 800 | 800 | 800 | 800 |
| Surface pattern of interlayer film | First surface | Ten-point average roughness Rz (μm) | 35 | 30 | 44 | 32 |
|  |  | Apex Sa (nm) | 279 | 280 | 253 | 253 |
|  |  | Arrangement density of protrusions (protrusions/mm$^2$) | 4.6 | 12.9 | 4.5 | 2.2 |
|  |  | Area ratio of protrusions (%) | 44.4 | 44.4 | 76.8 | 61.1 |
|  | Second surface | Ten-point average roughness Rz (μm) | 42 | 29 | 44 | 32 |
|  |  | Apex Sa (nm) | 235 | 245 | 258 | 235 |
|  |  | Arrangement density of protrusions (protrusions/mm$^2$) | 4.5 | 12.9 | 4.5 | 2.2 |
|  |  | Area ratio of protrusions (%) | 44.4 | 44.4 | 76.8 | 61.3 |
| Evaluation | Autohesion force (N/cm) |  | 0.55 | 0.44 | 0.71 | 0.79 |
|  | Deaeration properties |  | ○ | ○ | x | ○ |

INDUSTRIAL APPLICABILITY

The present invention can provide an interlayer film for a laminated glass which is easily peelable without autohesion even after storage in a stacked state, and a laminated glass prepared using the interlayer film for a laminated glass.

The invention claimed is:

1. An interlayer film for a laminated glass, having a large number of protrusions on at least one surface,
wherein the surface has an arrangement density of the protrusions of 3 protrusions/mm$^2$ or more,
wherein the protrusions have an area ratio of 15% to 75% to the surface, and
wherein the protrusions each have an arithmetical mean height Sa on the surface of 200 nm or more as measured in conformity with ISO 25178.

2. A laminated glass including:
a pair of glass plates; and
the interlayer film for a laminated glass according to claim 1 interposed between the pair of glass plates.

* * * * *